(12) United States Patent
Song et al.

(10) Patent No.: US 8,428,200 B2
(45) Date of Patent: Apr. 23, 2013

(54) APPARATUS FOR ESTIMATING FREQUENCY OFFSET IN OFDM SYSTEM

(75) Inventors: Chonghan Song, Suwon-si (KR); Junhwan Kim, Suwon-si (KR); Youngpo Lee, Suwon-si (KR); Seung Goo Kang, Suwon-si (KR); Seokho Yoon, Suwon-si (KR)

(73) Assignee: Sungkyunkwan University Foundation for Corporate Collaboration, Suwon-Si, Gyeonggi-Do (KR)

( * ) Notice: Subject to any disclaimer, the term of this patent is extended or adjusted under 35 U.S.C. 154(b) by 358 days.

(21) Appl. No.: 12/893,579

(22) Filed: Sep. 29, 2010

(65) Prior Publication Data

US 2011/0274219 A1  Nov. 10, 2011

(30) Foreign Application Priority Data

May 6, 2010  (KR) .................. 10-2010-0042289

(51) Int. Cl.
*H04L 27/06* (2006.01)

(52) U.S. Cl.
USPC ..... 375/344; 375/377; 455/182.2; 455/192.2; 702/181

(58) Field of Classification Search .................. 375/259, 375/260, 314, 340, 345, 377, 317, 344; 702/179, 702/181; 455/182.1, 182.2, 192.1, 192.2
See application file for complete search history.

(56) References Cited

U.S. PATENT DOCUMENTS

| | | | |
|---|---|---|---|
| 7,418,147 B2 * | 8/2008 | Kamaci et al. ................. 382/251 |
| 8,233,873 B2 * | 7/2012 | Principe et al. ................ 455/307 |
| 2010/0266041 A1 * | 10/2010 | Gish et al. ................ 375/240.15 |

* cited by examiner

*Primary Examiner* — Dac Ha
(74) *Attorney, Agent, or Firm* — Womble Carlyle

(57) ABSTRACT

Provided is an apparatus for estimating a frequency offset by one training symbol including two symbols having the same structure and value in an OFDM system. The apparatus includes a first likelihood function calculator for modeling non-Gaussian impulsive noise included in the training symbol to a Cauchy probability density function in which a characteristic exponent of a BISαS probability density function is 1, and calculating a likelihood function of a Cauchy distribution using the Cauchy probability density function, and a first frequency offset estimator for estimating an effective frequency offset value in which the likelihood function of the Cauchy distribution of the first likelihood function calculator becomes highest as a frequency offset estimation value. Thereby, it is possible to improve the performance of frequency offset estimation in non-Gaussian impulsive noise environments.

18 Claims, 5 Drawing Sheets

APPARATUS FOR ESTIMATING FREQUENCY OFFSET IN OFDM SYSTEM

RELATED APPLICATIONS

The present application claims priority to KR 10-2010-0042289, filed May 6, 2010. The contents of the aforementioned application are incorporated by reference in their entirety.

BACKGROUND OF THE INVENTION

1. Field of the Invention

The present invention relates to an apparatus for estimating a frequency offset in an orthogonal frequency division multiplexing (hereinafter, referred to as "OFDM") system.

2. Description of the Related Art

OFDM systems are advantageous in that frequency use efficiency is high, and a simple equalization structure robust to multipath fading is provided, as compared with existing single carrier communication systems.

Because of these advantages, it had been adopted as a standard of various communication systems such as a digital subscriber line (DSL), European digital audio and video broadcasting (DAB/DVB), IEEE 802.11a, Hiper-LAN II, and the like. Recently, a multi-user OFDM technique has been adopted as the IEEE 802.16 standard. However, the performance of the OFDM systems is significantly sensitive to a frequency offset caused by a Doppler phenomenon or oscillator mismatch between a transmitter and a receiver. If there is the frequency offset, the orthogonality between subcarriers is destructed and thereby interference is caused. Consequently, the performance of the OFDM systems is seriously degraded. Accordingly, a process of estimating the frequency offset is very important in the OFDM systems.

In the related art, various frequency offset estimation techniques for frequency offset estimation have been proposed. However, the techniques of the related art have been developed under the assumption that noise is in a Gaussian distribution for the sake of simplicity and easy treatment. However, since noise in actual communication systems conforms to a non-Gaussian distribution exhibiting impulsiveness by atmospheric noise or artificial noise, the frequency offset estimation techniques of the related art have a problem in that the performance of estimation is degraded in non-Gaussian impulsive noise environments close to actual environments.

SUMMARY OF THE INVENTION

The present invention provides a frequency offset estimating apparatus for estimating a frequency offset in non-Gaussian impulsive noise environments. Also, the present invention provides a frequency offset estimating apparatus capable of estimating a frequency offset while reducing complexity in non-Gaussian impulsive noise environments.

According to an exemplary embodiment of the present invention, there is provided an apparatus for estimating a frequency offset using one training symbol including two symbols having the same structure and value in an OFDM system. The apparatus includes a first likelihood function calculator for modeling non-Gaussian impulsive noise included in the training symbol to a Cauchy probability density function in which a characteristic exponent of a bivariate isotropic symmetric alpha-stable (hereinafter, referred to as "BISαS") probability density function is 1, and calculating a likelihood function of a Cauchy distribution using the Cauchy probability density function, and a first frequency offset estimator for estimating an effective frequency offset value in which the likelihood function of the Cauchy distribution of the first likelihood function calculator becomes highest as a frequency offset estimation value.

According to another exemplary embodiment of the present invention, there is provided an apparatus for estimating a frequency offset by one training symbol, which includes N samples and includes first and second training symbols having the same structure and value, in an OFDM system. The apparatus includes a first likelihood function calculator for calculating non-Gaussian impulsive noise included in the training symbol by a likelihood function of a Cauchy distribution in which a characteristic exponent of a BISαS probability density function is 1, a second likelihood function calculator for calculating non-Gaussian impulsive noise included in the training symbol by a likelihood function of a Gaussian distribution in which the characteristic exponent of a BISαS probability density function is 2, a second frequency offset estimator for estimating a first frequency offset estimation value by adding correlation values of two samples separated by N/2 for k from 0 to $$\frac{N}{2} - 1$$

in the likelihood function of the Gaussian distribution of the second likelihood function calculator, a trial value set calculator for calculating the correlation values of the second frequency offset estimator as N/2 effective frequency offset values according to values of the N samples, and a third frequency offset estimator for estimating an effective frequency offset value in which the likelihood function of the Gaussian distribution of the first likelihood function calculator is highest among the effective frequency offset values of the trial value set calculator as a second frequency offset estimation value.

DETAILED DESCRIPTION OF EXEMPLARY EMBODIMENTS

Figure 1:
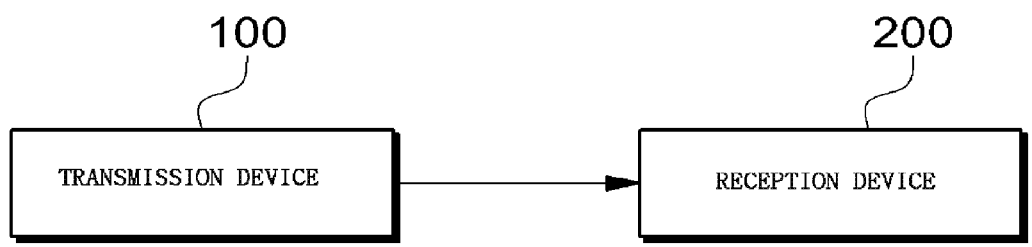
FIG. 1 is a schematic configuration diagram of an OFDM system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements throughout the specification. The terms "-er," "-or," and "module" described in the specification mean units for processing at least one function or operation, which can be implemented by hardware components, software components, or combinations thereof.

A method of estimating a frequency offset in an OFDM system according to an exemplary embodiment of the present invention will now be described in detail with reference to the drawings.

FIG. 1 is a schematic configuration diagram of an OFDM system according to an exemplary embodiment of the present invention.

As shown in FIG. 1, the OFDM system largely includes a transmission device 100 and a reception device 200. The reception device 200 includes a frequency offset estimating apparatus for estimating a frequency offset caused by oscillator mismatch between the transmission device 100 and the reception device 200.

The transmission device 100 modulates data to be transmitted by using phase shift keying (hereinafter, referred to as "PSK") or quadrature amplitude modulation (hereinafter, referred to as "QAM"), and generates an OFDM signal by performing an inverse fast Fourier transform (hereinafter, referred to as "IFFT") process for the modulated data.

An OFDM signal x(k) to be transmitted from the transmission device 100 can be expressed as shown in the following Equation (1).

$$x(k) = \frac{1}{\sqrt{N}} \sum_{n=0}^{N-1} X_n e^{j2\pi kn/N}, \text{ for } k = 0, 1, \ldots, N-1 \quad (1)$$

Here, k denotes a sample index, N denotes an IFFT size, and $X_n$ denotes $n^{th}$ PSK or QAM modulated data.

Assuming that time synchronization is perfectly acquired, an OFDM symbol y(k) received by the reception device 200 via a channel can be expressed as shown in the following Equation (2).

$$y(k) = \sum_{l=0}^{L-1} h(l)x(k-l)e^{j2\pi kv/N} + n(k), \text{ for } k = 0, 1, \ldots, N-1 \quad (2)$$

Here, h(l) is an $l^{th}$ tap of a channel impulse response coefficient of a length L, v is a frequency offset normalized at a subcarrier interval, and n(k) is complex additive white non-Gaussian impulsive noise.

In general, the frequency offset can be divided into an integer part and a fractional part as shown in the following Equation (3).

$$v = m + \epsilon \quad (3)$$

Here, m denotes an integer multiple of a subcarrier interval as the integer part of the frequency offset, $\epsilon$ is the fractional part in a range of $\epsilon \in [-0.5, 0.5]$ within half of the subcarrier interval. The present invention aims at estimating the fractional part $\epsilon$ of the frequency offset. Hereinafter, it is assumed that the integer part $\epsilon$ is perfectly estimated and compensated.

In the present invention, non-Gaussian impulsive noise is modeled using a symmetric alpha-stable (hereinafter, referred to as "SαS") distribution known to be suitable for a non-Gaussian impulsive distribution. The complex additive white non-Gaussian impulsive noise n(k) of the above-described Equation (2) can be modeled to a bivariate isotropic SαS (hereinafter, referred to as "BISαS") probability density function having a mean value of 0 as shown in the following Equation (4).

$$f_{\alpha,\gamma}(n_I, n_Q) = \frac{1}{(2\pi)^2} \int_{-\infty}^{\infty} \int_{-\infty}^{\infty} \Phi_{N_I,N_Q}(w_1, w_2) e^{-j(w_1 n_I + w_2 n_Q)} dw_1 dw_2 \quad (4)$$

Here, α is a characteristic exponent, γ is a dispersion parameter, $\Phi_{N_I,N_Q}(w_1,w_2)$ is a characteristic function of a complex BISαS probability parameter, $n_I$ and $n_Q$ are respectively an integer part and a fractional part of the non-Gaussian impulsive noise, and a range of the characteristic exponent α is $0 < \alpha \leq 2$.

Figure 2:
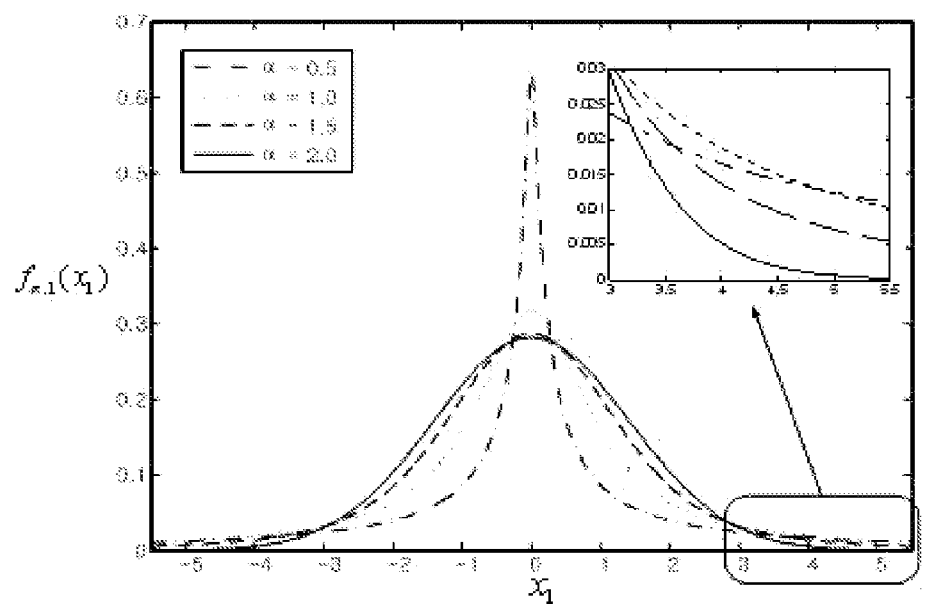
FIG. 2 is a graph showing a BISαS probability density function $f_{\alpha,1}(x_1)$ according to an integer part of non-Gaussian impulsive noise when $\gamma=1$ according to an exemplary embodiment of the present invention.

FIG. 2 is a graph showing a BISαS probability density function $f_{\alpha,1}(x_1)$ according to an integer part of non-Gaussian impulsive noise when γ=1 according to an exemplary embodiment of the present invention.

As shown in FIG. 2, values of both ends of the BISαS probability density function $f_{\alpha,1}(x_1)$ increase as the characteristic exponent α decreases. This means that a value of the BISαS probability density function $f_{\alpha,1}(x_1)$ increases when the integer part of the non-Gaussian impulsive noise increases in a positive or negative direction as the characteristic exponent α decreases, that is, that the impulsive noise increases when the characteristic exponent α decreases and the integer part of the non-Gaussian impulsive noise increases (in the positive and negative directions).

The dispersion parameter γ(γ>0) indicates the dispersion of the probability density function like that of a Gaussian distribution, and the characteristic function $\Phi_{N_I,N_Q}(w_1,w_2)$ of the complex BISαS probability parameter can be expressed as shown in the following Equation (5).

$$\Phi_{N_I,N_Q}(w_1, w_2) = E[e^{jRe\{(w_1+jw_2)(N_I+jN_Q)^*\}}] \quad (5)$$
$$= E[e^{j(w_1 N_I + w_2 N_Q)}]$$
$$= e^{-\gamma|w_1+w_2|^\alpha}$$

Here, E[●] and Re[●] are respectively operators for taking a statistical mean and a real value, and * is a complex conjugate. In general, the BISαS probability density function does not exist in a closed form, but the BISαS probability density function of the closed form can be exceptionally expressed as shown in the following Equation (6) when the characteristic exponent α is 1 and 2.

$$f_{\alpha,\gamma}(r) = \begin{cases} \dfrac{\gamma}{2\pi(\gamma^2 + r^2)^{3/2}}, & \alpha = 1 \\ \dfrac{1}{4\pi\gamma}e^{-\frac{r^2}{4\gamma}}, & \alpha = 2 \end{cases} \quad (6)$$

Here, r is $|n|=\sqrt{n_I^2+n_Q^2}$, as an absolute value of the non-Gaussian impulsive noise. As shown in the above-described Equation (6), the BISαS probability density function becomes a complex Cauchy probability density function when the characteristic function α is 1, and the BISαS probability density function becomes a complex Gaussian probability density function when the characteristic function α is 2.

Through the above-described Equations (1) to (6), the non-Gaussian impulsive noise is modeled to the probability density function. Hereinafter, a method of calculating a likelihood function using the modeled probability density function and estimating a frequency offset using the likelihood function will be described in detail with reference to the drawings.

Figure 3:
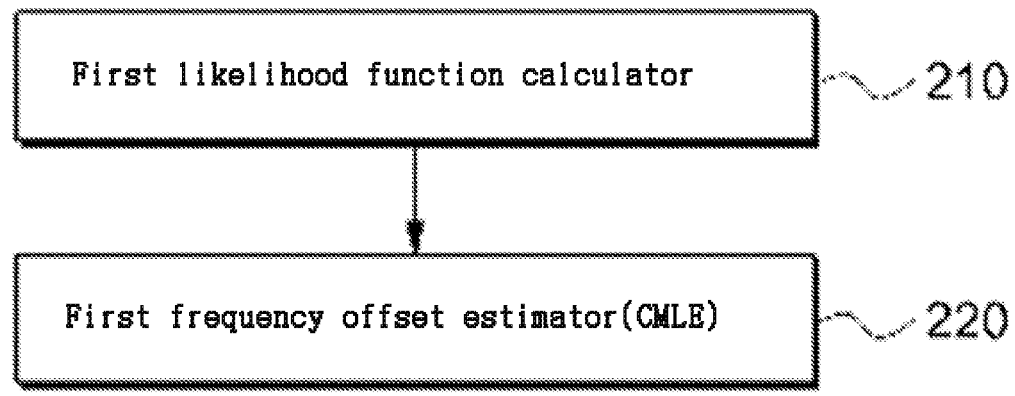
FIG. 3 is a schematic configuration diagram of a frequency offset estimating apparatus of an OFDM system according to a first exemplary embodiment of the present invention.

FIG. 3 is a schematic configuration diagram of a frequency estimating apparatus of an OFDM system according to a first exemplary embodiment of the present invention.

As shown in FIG. 3, the frequency offset estimating apparatus includes a first likelihood function calculator 210 and a first frequency offset estimator 220. Of course, the frequency offset estimating apparatus according to the first exemplary embodiment of the present invention may include other elements as well as the first likelihood function calculator 210 and the first frequency offset estimator 220.

The first likelihood function calculator 210 of the present invention models non-Gaussian impulsive noise included in a training symbol of an OFDM signal received from the transmission device 100 to the Cauchy probability density function of the above-described Equation (6), and calculates a likelihood function of a Cauchy distribution in which a non-Gaussian impulsive noise component has a dispersion parameter $2_\gamma$ in the Cauchy probability density function.

Now, the training symbol of the present invention will be described.

Figure 4:
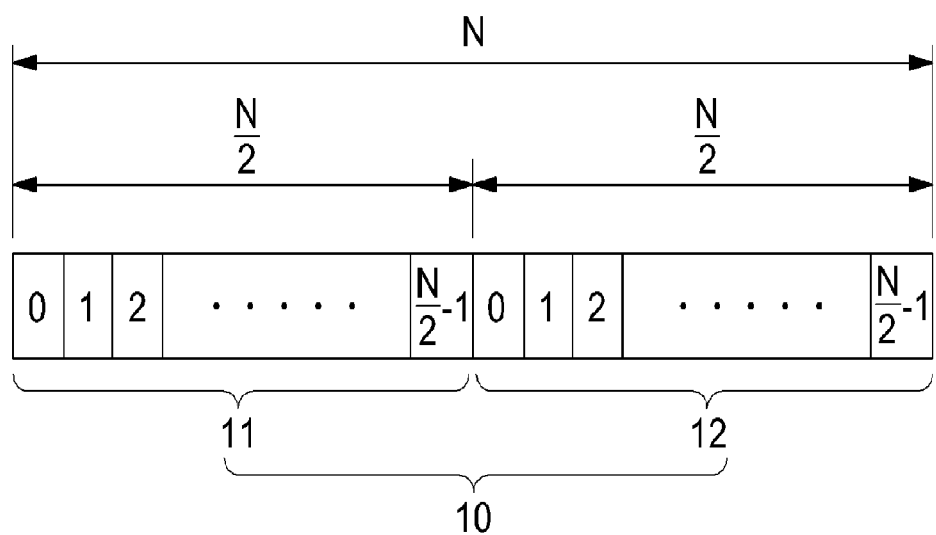
FIG. 4 is a diagram showing a data structure of a training symbol according to an exemplary embodiment of the present invention.

FIG. 4 is a diagram showing a data structure of a training symbol according to an exemplary embodiment of the present invention.

As shown in FIG. 4, a training symbol 10 includes N samples. The training symbol 10 includes a first training symbol 11 having N/2 first samples and a second training symbol 12 having N/2 second samples. The first training symbol 11 and the second training symbol 12 have the same data structure and value.

A $k^{th}$ sample of the first training symbol 11 from which the non-Gaussian impulsive noise is omitted can be expressed as shown in the following Equation (7).

$$r(k) = \sum_{l=0}^{L-1} h(l)x(k-l)e^{j2\pi k\varepsilon/N}, \text{ for } k = 0, 1, \ldots, \frac{N}{2}-1 \quad (7)$$

A $k^{th}$ sample of the second training symbol 12 from which the non-Gaussian impulsive noise is omitted can be expressed as shown in the following Equation (8).

$$r\left(k+\frac{N}{2}\right) = \sum_{l=0}^{L-1} h(l)x\left(k+\frac{N}{2}-l\right)e^{j2\pi(k+\frac{N}{2})\varepsilon/N} \quad (8)$$

$$= \sum_{l=0}^{L-1} h(l)x(k-l)e^{j2\pi k\varepsilon/N}e^{j\pi\varepsilon},$$

for $k = 0, 1, \ldots, \frac{N}{2}-1$

In the above-described Equations (7) and (8), h(l) is an $l^{th}$ tap of a channel impulse response coefficient of a length L, and ε is a fractional part of a frequency offset.

Since the first training symbol 11 and the second training symbol 12 have the same data structure and value, the $k^{th}$ sample of the second training symbol 12 from which the non-Gaussian impulsive noise is omitted can be expressed as shown in the following Equation (9) using the above-described Equations (7) and (8).

$$r\left(k+\frac{N}{2}\right) = r(k)e^{j\pi\varepsilon}, \text{ for } k = 0, 1, \ldots, \frac{N}{2}-1 \quad (9)$$

The present invention aims at estimating a frequency offset in consideration of non-Gaussian impulsive noise. The $k^{th}$ samples of the first training symbol 11 and the second training symbol 12 can be expressed as shown in the following Equations (10) and (11).

$$y(k) = r(k) + n_1(k), \text{ for } k = 0, 1, \ldots, \frac{N}{2}-1 \quad (10)$$

$$y\left(k+\frac{N}{2}\right) = r(k)e^{j\pi\varepsilon} + n_2(k), \text{ for } k = 0, 1, \ldots, \frac{N}{2}-1 \quad (11)$$

In the above-described Equations (10) and (11), $n_1(k)$ is first non-Gaussian impulsive noise included in the first training symbol 11, $n_2(k)$ is second non-Gaussian impulsive noise included in the second training symbol 12, and the first non-Gaussian impulsive noise $n_1(k)$ and the second non-Gaussian impulsive noise $n_2(k)$ are modeled to the Cauchy probability density function in which the characteristic exponent α is 1 in the BISαS probability density function.

The first likelihood function calculator 210 of the present invention calculates a likelihood function of a Cauchy distribution by using the first training symbol 11 and the second training symbol 12 having the non-Gaussian impulsive noise according to the above-described Equations (10) and (11).

First, when the above-described Equation (10) is substituted into the above-described Equation (11), the $k^{th}$ sample of the second training symbol 12 having the non-Gaussian impulsive noise can be expressed as shown in the following Equation (12).

$$y\left(k+\frac{N}{2}\right) = [y(k) - n_1(k)]e^{j\pi\varepsilon} + n_2(k) \quad (12)$$

$$= y(k)e^{j\pi\varepsilon} - n_1(k)e^{j\pi\varepsilon} + n_2(k)$$

$$y\left(k+\frac{n}{2}\right) - y(k)e^{j\pi\varepsilon} = -n_1(k)e^{j\pi\varepsilon} + n_2(k),$$

for $k = 0, 1, \ldots, \frac{N}{2}-1$

In the above-described Equation (12), $-n_1(k)e^{j\pi\epsilon}+n_2(k)$ indicating the non-Gaussian impulsive noise has the Cauchy distribution in which a dispersion parameter is $2_\gamma$.

Accordingly, the first likelihood function calculator 210 calculates the likelihood function of the Cauchy distribution using the above-described Equation (12), and the likelihood function of the Cauchy distribution can be expressed as shown in the following Equation (13).

$$\Lambda_C(\tilde{\epsilon}) = \log\left[\prod_{k=0}^{N/2-1} f_{1,2\gamma}\left\{\left|y\left(k+\frac{N}{2}\right) - y(k)e^{j\pi\tilde{\epsilon}}\right|\right\}\right] \quad (13)$$
$$= \sum_{k=0}^{N/2-1} \log\left[\frac{\gamma}{2\pi} \frac{1}{\left\{4\gamma^2 + \left|y\left(k+\frac{N}{2}\right)y(k)e^{j\pi\tilde{\epsilon}}\right|^2\right\}^{3/2}}\right]$$

Here, $\tilde{\epsilon}$ is a trial value of a fractional part $\epsilon$ of a frequency offset, and a range of $\tilde{\epsilon}$ is $\tilde{\epsilon}\in[-0.5, 0.5]$.

As described above, the first likelihood function calculator 210 of the present invention calculates the likelihood function of the Cauchy distribution by using the first non-Gaussian impulsive noise $n_1(k)$ and the second non-Gaussian impulsive noise $n_2(k)$ respectively included in the first training symbol 11 and the second training symbol 12 having the same data structure and value among received OFDM signals.

That is, the first likelihood calculator 210 models the first non-Gaussian impulsive noise and the second non-Gaussian impulsive noise to a Cauchy probability density function in which the characteristic exponent of the BIS$\alpha$S probability density function is 1, and calculates a likelihood function of a Cauchy distribution in which a noise component $-n_1(k)e^{j\pi\epsilon}+n_2(k)$ of the first non-Gaussian impulsive noise and the second non-Gaussian impulsive noise has a dispersion parameter $2_\gamma$ in the Cauchy probability density function.

Then, the first frequency offset estimator 220 estimates an effective frequency offset value in which the likelihood function is highest among effective frequency offset values $\tilde{\epsilon}$ as a frequency offset estimation value. The first frequency offset estimator 220 is referred to as a "CMLE" in the present invention.

A frequency offset estimation value $\hat{\epsilon}_C$ of the CMLE can be expressed as shown in the following Equation (14).

$$\hat{\epsilon}_C = \underset{\tilde{\epsilon}}{\operatorname{argmax}}\{\Lambda_C(\tilde{\epsilon})\} \quad (14)$$

In the first exemplary embodiment of the present invention as described above, it is possible to improve the performance of frequency offset estimation in non-Gaussian impulsive noise environments by estimating a frequency offset in consideration of non-Gaussian impulsive noise in an OFDM system.

Figure 5:
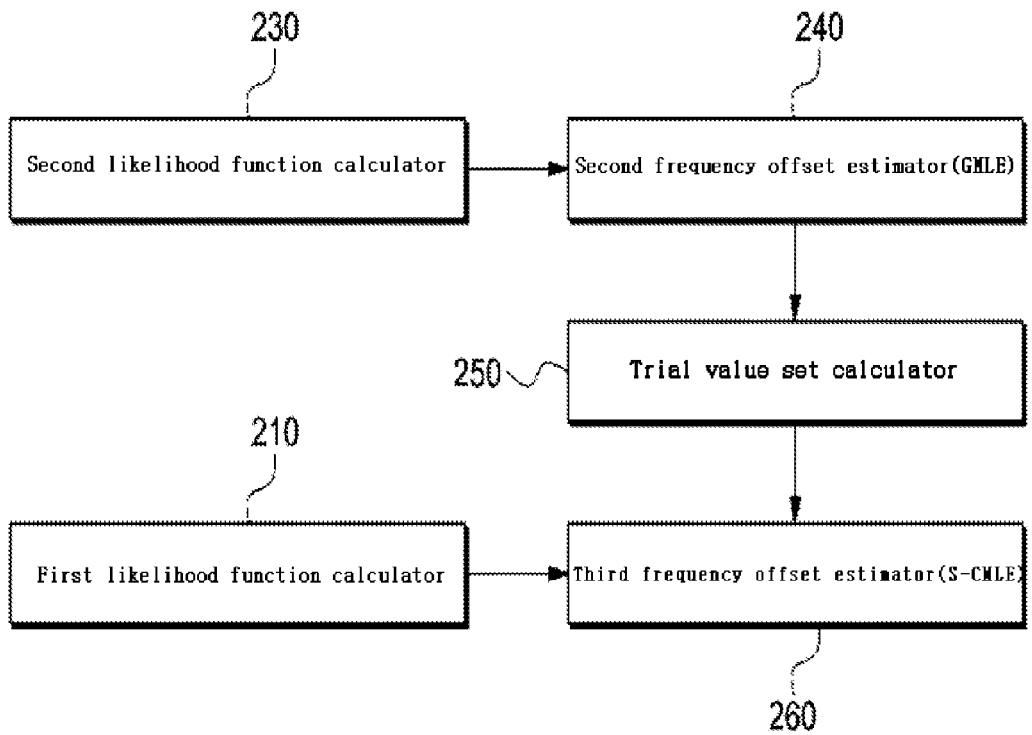
FIG. 5 is a schematic configuration diagram of a frequency offset estimating apparatus of an OFDM system according to a second exemplary embodiment of the present invention.

FIG. 5 is a schematic configuration diagram of a frequency offset estimating apparatus of an OFDM system according to a second exemplary embodiment of the present invention.

As shown in FIG. 5, the frequency offset estimating apparatus according to the second exemplary embodiment of the present invention includes a first likelihood function calculator 210, a second likelihood function calculator 230, a second frequency offset estimator 240, a trial value set calculator 250, and a third frequency offset estimator 260. Since the first likelihood function calculator 210 is the same as that of the first exemplary embodiment of the present invention, specific description thereof is omitted hereinafter.

The second likelihood function calculator 230 calculates a likelihood function of a Gaussian distribution by using first non-Gaussian impulsive noise $n_1(k)$ and second non-Gaussian impulsive noise $n_2(k)$ respectively included in a first training symbol 11 and a second training symbol 12 having the same data structure and value among received OFDM signals.

That is, the second likelihood calculator 230 models the first non-Gaussian impulsive noise and the second non-Gaussian impulsive noise to a complex Gaussian probability density function in which a characteristic exponent of a BIS$\alpha$S probability density function is 2, and calculates a likelihood function of a Gaussian distribution in which a noise component $-n_1(k)e^{j\pi\epsilon}+n_2(k)$ of the first non-Gaussian impulsive noise and the second non-Gaussian impulsive noise has a dispersion parameter $2_\gamma$ in the complex Gaussian probability density function. The calculated likelihood function of the Gaussian distribution can be expressed as shown in the following Equation (15).

$$\Lambda_G(\tilde{\epsilon}) = \prod_{k=0}^{N/2-1} f_{2,2\gamma}\left\{\left|y\left(k+\frac{N}{2} - y(k)e^{j\pi\tilde{\epsilon}}\right)\right|\right\} \quad (15)$$
$$= \frac{1}{(8\pi\gamma)^{N/2}} e^{-\frac{1}{8\gamma}\sum_{k=0}^{N/2-1}\left|y\left(k+\frac{N}{2}\right)-y(k)e^{j\pi\tilde{\epsilon}}\right|^2}$$

Here, $\tilde{\epsilon}$ is a trial value of a fractional part $\epsilon$ of a frequency offset and a range of $\tilde{\epsilon}$ is $\tilde{\epsilon}\in[-0.5, 0.5]$.

The second frequency offset estimator 240 can derive a maximum likelihood estimator in Gaussian distribution noise as shown in the following Equation (16) by substituting the above-described Equation (15) into the above-described Equation (14).

$$\hat{\epsilon}_G = \frac{1}{\pi}\angle\left\{\sum_{k=0}^{N/2-1} y^*(k)y\left(k+\frac{N}{2}\right)\right\} \quad (16)$$

Here, k is a sample index, N is the number of samples of the training symbol, $y^*(k)$ is a complex conjugate of a $k^{th}$ sample of the first training symbol, and $$y\left(k+\frac{N}{2}\right)$$

is a $k^{th}$ sample of the second training symbol.

The second frequency offset estimator 240 estimates a frequency offset estimation value $\hat{\epsilon}_C$ by adding correlation values of two samples separated by N/2 from 0 to $$\frac{N}{2} - 1.$$

In the present invention, the second frequency offset estimator 240 is referred to as a "GMLE."

Assuming that noise is in a Gaussian distribution, the GMLE 240 estimates a frequency offset on the basis of a maximum likelihood function in a well-known estimation method. The GMLE 240 of the related art has excellent performance when a characteristic exponent α of a BISαS probability density function is 2, but has a problem in that the performance of frequency offset estimation is degraded when the characteristic exponent α is small.

The GMLE 240 performs a process of adding correlation values $$y^*(k)y\left(k + \frac{N}{2}\right)$$

of two samples separated by N/2 for k from 0 to $$\frac{N}{2} - 1$$

as shown in the above-described Equation (16). However, the GMLE 240 adds correlation values of samples including noise of a relatively high amplitude in non-Gaussian impulsive noise environments. This becomes a factor which degrades the entire performance of frequency offset estimation.

The performance of the CMLE 220 is determined according to how finely effective frequency offset values $\tilde{\epsilon}$ are divided and checked in a frequency offset estimation range $$|\tilde{\epsilon}| \le \frac{1}{2}.$$

For more accurate frequency offset estimation, relatively high complexity is required in the CMLE 220.

Accordingly, in the frequency offset estimation apparatus according to the second exemplary embodiment of the present invention, an apparatus is proposed to calculate a new trial value set using correlation values of the GMLE 240, and estimate a frequency offset by applying the new trial value set to the CMLE 220, so as to reduce the complexity according to the first exemplary embodiment of the present invention.

More specifically, the trial value set calculator 250 calculates the new trial value set as shown in the following Equation (17).

$$\bar{\epsilon}(k) = \frac{1}{\pi} \angle \left\{ y^*(k)y\left(k + \frac{N}{2}\right) \right\}, \text{ for } k = 0, 1, \ldots, \frac{N}{2} - 1 \quad (17)$$

Here, k is a sample index and the trial value set calculator 250 calculates N/2 $\bar{\epsilon}(k)$ elements according to a value of k as the new trial value set.

The third frequency offset estimator 260 estimates an effective frequency offset value in which a likelihood function is highest in a trial value set $\bar{\epsilon}(k)$ the trial value set calculator 250 as a frequency offset. In the present invention, the third frequency offset estimator 260 is referred to as an "S-CMLE."

A frequency offset estimation value $\hat{\epsilon}_{SUB}$ of the S-CMLE 260 can be expressed as shown in the following Equation (18).

$$\hat{\epsilon}_{SUB} = \underset{\bar{\epsilon}(k)}{\mathrm{argmax}}[\Lambda_C\{\bar{\epsilon}(k)\}], \text{ for } k = 0, 1, \ldots, \frac{N}{2} - 1 \quad (18)$$

Here, $\Lambda_C\{\bar{\epsilon}(k)\}$ is a likelihood function of a Cauchy distribution according to the effective frequency offset value of the trial value set calculator 250.

As described above, the trial value set calculator 250 calculates N/2 effective frequency offset values $\bar{\epsilon}(k)$ according to k (which is the sample index) in an ideal environment without noise as a new trial value set, and the S-CMLE 260 estimates an effective frequency offset value in which the likelihood function of the Cauchy distribution is highest in the new trial value set of the trial value set calculator 250 as a frequency offset estimation value.

As described above, it is possible to reduce complexity by reducing the number of effective frequency offset values to N/2 in the second exemplary embodiment of the present invention as compared with the first exemplary embodiment of the present invention.

The S-CMLE 260 may have substantially the same frequency estimation performance as the CMLE using a larger number of trial values by finely dividing a frequency offset estimation interval.

Next, the performance of the present invention analyzed through a simulation will be described.

In the simulation, an FFT size N was 64, a length of a guard interval was 8 samples, and a training symbol was generated through a QPSK modulated pseudorandom code. A carrier frequency was 2.4 GHz and a channel model used 4-path Rayleigh fading. In a Rayleigh fading channel, paths respectively had delays of 0 samples, 2 samples, 4 samples, and 6 samples, and an $l^{th}$ path magnitude $A_l$ of the channel was exponentially reduced.

A power difference between a first path and a last path was 20 dB, and a Doppler bandwidth was 0.0017. This corresponds to the case where a terminal speed is 120 km/h.

Since a variance of BISαS noise is infinite when the characteristic exponent α is smaller than 2, a signal to noise ratio (hereinafter, referred to as "SNR") to be generally used is not applied. Accordingly, this simulation uses a G-SNR in place of the SNR when the BISαS noise is handled. The G-SNR effectively expresses relative magnitude between a signal having information and BISαS noise, and can be expressed as shown in the following Equation (19).

$$G\text{-}SNR = \frac{1}{2C_g}\left(\frac{A}{S_0}\right) \quad (19)$$

Here, $C_g$ is a value of $$\lim_{n \to \infty}\left\{\sum_{k=1}^{n}\frac{1}{k} - \ln(n)\right\} \simeq 1.78$$

as an exponent of Euler's constant, A is a signal intensity, $S_o$ is geometric power of BISαS noise, and $S_o$ is defined as $$\frac{(C_g\gamma)^{1/\alpha}}{C_g}.$$

In the above-described Equation (19), a normalization constant $2 C_g$ is the same as a standard SNR in the case of Gaussian noise in which α is 2.

Since a dispersion parameter γ is a value capable of being accurately estimated through a sample mean and variance of $X_I$ and $X_Q$, the simulation was performed by setting the dispersion parameter γ to 1.

FIGS. 6A to 6D are graphs showing simulation results and MSEs of frequency offset estimation values obtained through the GMLE of the related art and the CMLE, and the S-CMLE of the present invention according to G-SNR variations when a characteristic exponent α is 0.5, 1, 1.5, and 2.

Figure 6A:
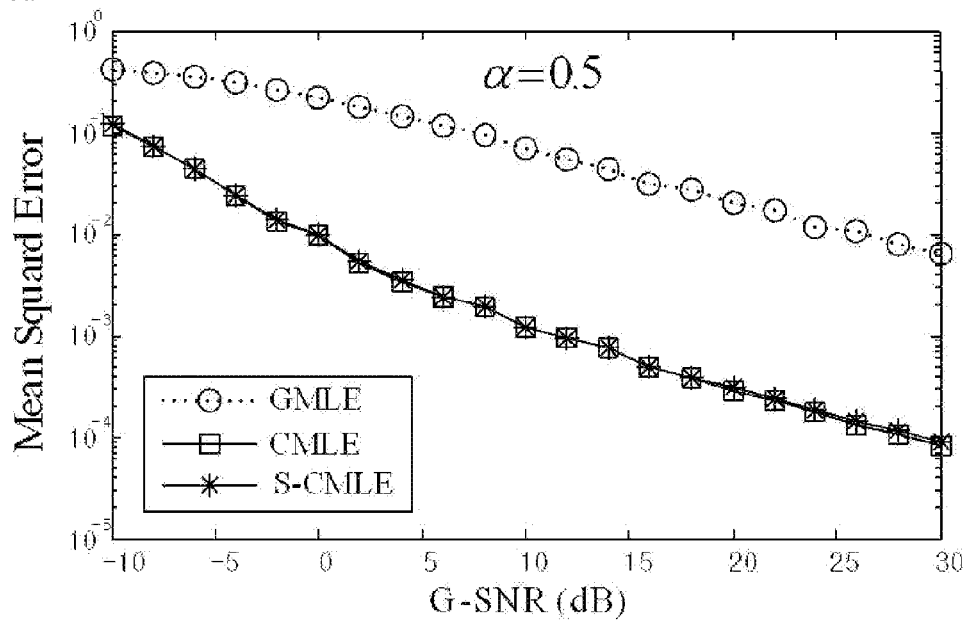
FIGS. 6A to 6D are graphs showing simulation results and mean squared errors (hereinafter, referred to as "MSEs") of frequency offset estimation values obtained through a Gaussian maximum likelihood estimator (hereinafter, referred to as "GMLE"), a Cauchy maximum likelihood estimator (hereinafter, referred to as "CMLE"), and a sub-optimum CMLE (hereinafter, referred to as "S-CMLE") according to geometric signal to noise ratio ("G-SNR") variations when a characteristic exponent α is 0.5, 1, 1.5, and 2.
Figure 6B:
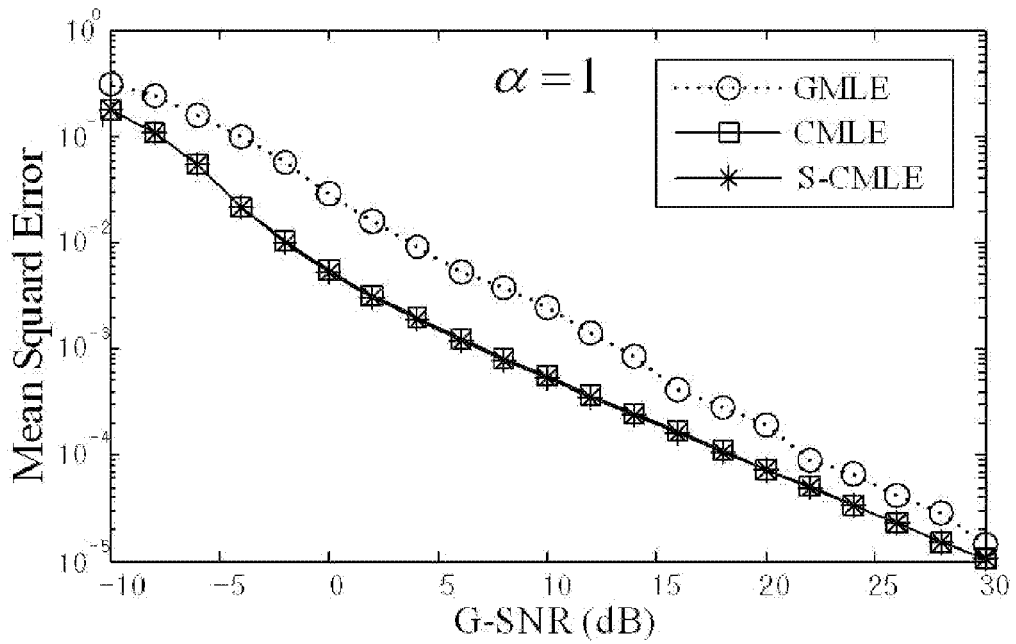

As shown in FIGS. 6A and 6B, the performance of frequency offset estimation of the CMLE 220 and the S-CMLE 260 according to the first and second exemplary embodiments of the present invention is far superior to that of the GMLE 240 of the related art in non-Gaussian impulsive noise environments where α is 0.5 and 1.

Figure 6C:
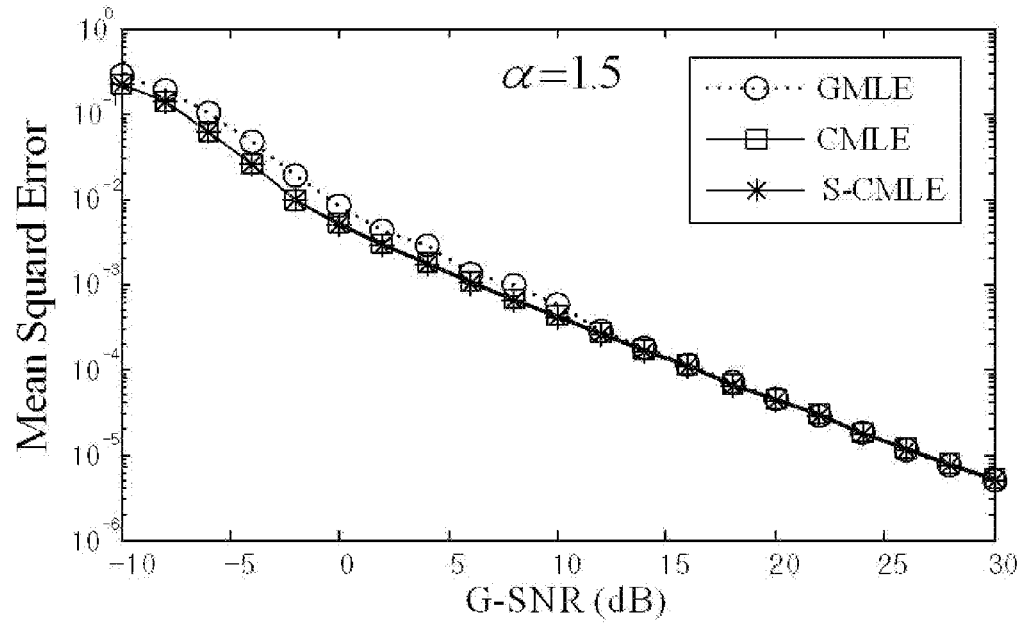

As shown in FIG. 6C, it can be seen that the performance of frequency offset estimation of the CMLE 220 and the S-CMLE 260 according to the first and second exemplary embodiments of the present invention slightly outperforms the GMLE 240 of the related art in a G-SNR range from −10 dB to 10 dB in non-Gaussian impulsive noise environments where α is 0.5.

Figure 6D:
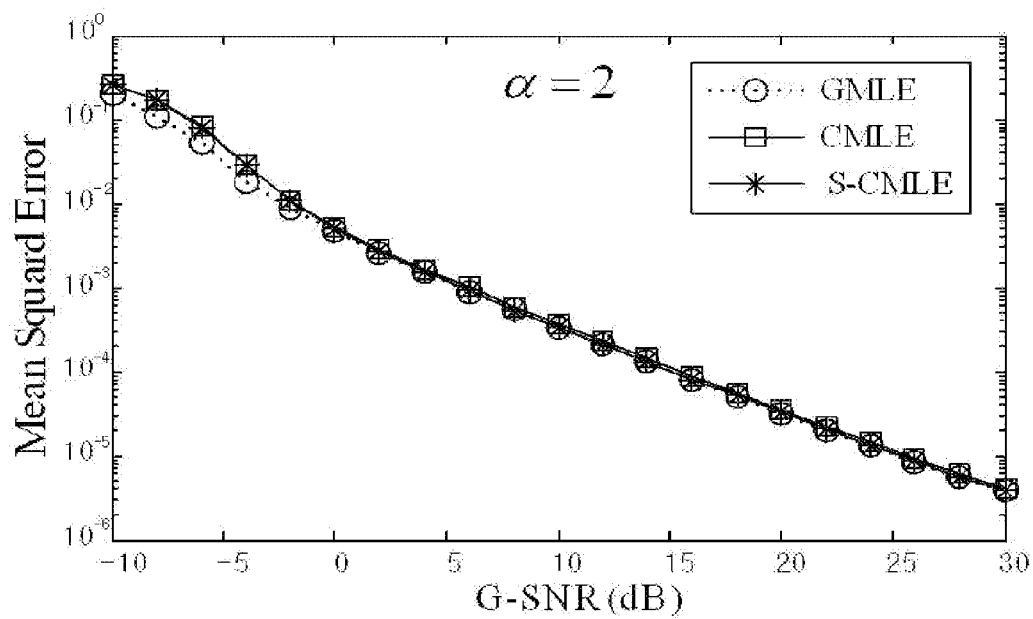

As shown in FIG. 6D, the performance of frequency offset estimation of the CMLE 220 and the S-CMLE 260 according to the first and second exemplary embodiments of the present invention outperforms the GMLE 240 of the related art to some extent in a G-SNR range from −10 dB to 0 dB in Gaussian noise environments where α is 2, but the performance of frequency offset estimation of the CMLE 220 and the S-CMLE 260 considering Cauchy noise in a range in which a G-SNR is equal to or greater than 0 dB is similar to that of the GMLE 240 of the related art.

As shown in FIGS. 6A to 6D, the S-CMLE 260 according to the second exemplary embodiment of the present invention uses a small number of effective frequency offset values as compared with the CMLE 220 according to the first exemplary embodiment of the present invention, but has the same MSE performance as the CMLE 220.

Figure 7:
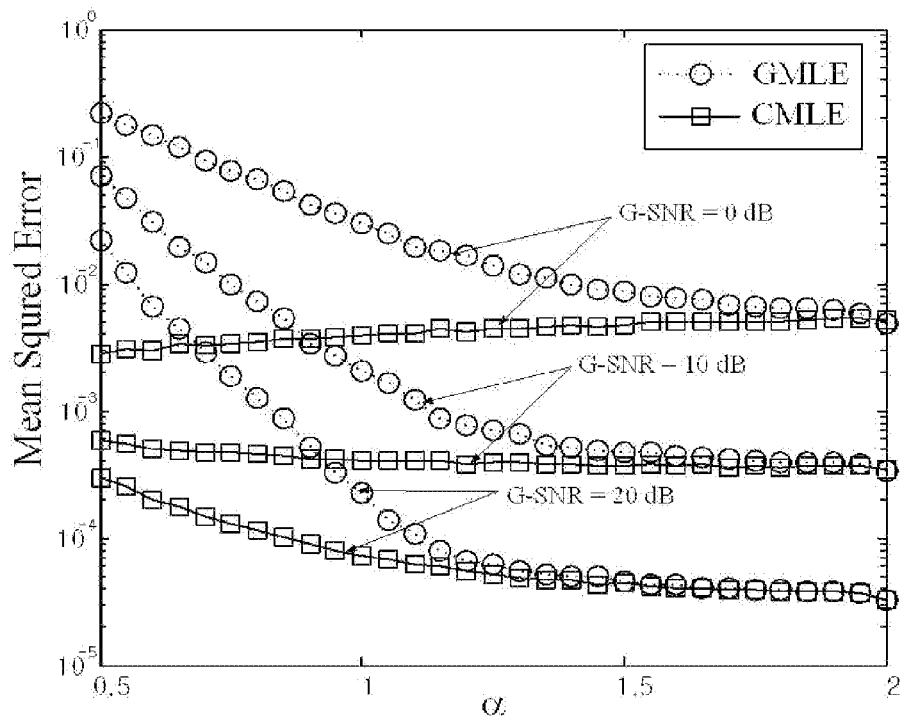
FIG. 7 is a graph showing MSEs of frequency offset estimation values of the GMLE and the CMLE according to variations of a characteristic exponent α when a G-SNR is 0, 10, and 20 dB in a Rayleigh fading environment.

FIG. 7 is a graph showing MSEs of frequency offset estimation values of the GMLE and the CMLE according to variations of a characteristic exponent α when a G-SNR is 0, 10, and 20 dB in Rayleigh fading environments.

As shown in FIG. 7, it can be seen that the MSE performance of the GMLE 240 is rapidly varied when α is varied from 0.5 to 2, and is rapidly degraded when α is equal to or less than 1.

However, the CMLE 220 according to the first exemplary embodiment of the present invention maintains the uniform MSE performance over α regardless of the variation of α differently from the GMLE 240. That is, the CMLE 220 according to the first exemplary embodiment of the present invention exhibits excellent MSE performance as compared with the GMLE 240 of the related art in the non-Gaussian impulsive noise environments.

The S-CMLE 260 according to the second exemplary embodiment of the present invention has the effect of reducing complexity by reducing the number of effective frequency offset values by N/2 as compared with the CMLE 220 according to the first exemplary embodiment of the present invention.

In the exemplary embodiments of the present invention, the performance of frequency offset estimation can be improved by estimating a frequency offset in consideration of non-Gaussian impulsive noise in an OFDM system. Also, complexity can be reduced by exploiting a smaller number of new effective frequency offset values as compared with the related art and estimating a frequency offset.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for estimating a frequency offset using one training symbol including two symbols having the same structure and value in an OFDM system, comprising:

a first likelihood function calculator for modeling non-Gaussian impulsive noise included in the training symbol to a Cauchy probability density function in which a characteristic exponent of a bivariate isotropic symmetric alpha-stable (BISαS) probability density function is 1, and calculating a likelihood function of a Cauchy distribution using the Cauchy probability density function; and a first frequency offset estimator for estimating an effective frequency offset value in which the likelihood function of the Cauchy distribution of the first likelihood function calculator becomes highest as a frequency offset estimation value.

2. The apparatus according to claim 1, wherein the first likelihood function calculator models the non-Gaussian impulsive noise to the BISαS probability density function by using an SαS distribution.

3. The apparatus according to claim 1, wherein the likelihood function of the Cauchy distribution is expressed by:

$$\Lambda_G(\tilde{\varepsilon}) = \prod_{k=0}^{N/2-1} f_{2,2\gamma}\left\{\left|y\left(k + \frac{N}{2}\right) - y(k)e^{j\pi\tilde{\varepsilon}}\right|\right\}$$
$$= \frac{1}{(8\pi\gamma)^{N/2}} e^{-\frac{1}{8\gamma}\sum_{k=0}^{N/2-1}\left|y\left(k+\frac{N}{2}\right)-y(k)e^{j\pi\tilde{\varepsilon}}\right|^2},$$

where k is a sample index, N is an interger representing the number of samples of the training symbol as the number of IFFT points, y(k) is a $k^{th}$ sample of a first training symbol including N/2 first samples of the training symbol, $$y\left(k + \frac{N}{2}\right)$$

is a $k^{th}$ sample of a second training symbol including N/2 second samples of the training symbol, $\tilde{\varepsilon}$ is a trial value of a fractional part ε of a frequency offset, and a range of $\tilde{\varepsilon}$ is $\tilde{\varepsilon} \in [-0.5, 0.5]$.

4. The apparatus according to claim 3, wherein the first training symbol including the non-Gaussian impulsive noise is expressed by:

$$y(k) = r(k) + n_1(k), \text{ for } k = 0, 1, \ldots, \frac{N}{2} - 1,$$

where k is a sample index, r(k) is a $k^{th}$ sample of the second training symbol in which the non-Gaussian impulsive noise is not included, and $n_1(k)$ is first non-Gaussian impulsive noise included in the first training symbol.

5. The apparatus according to claim 3, wherein the second training symbol including the non-Gaussian impulsive noise is expressed by:

$$y\left(k + \frac{N}{2}\right) = r(k)e^{j\pi\epsilon} + n_2(k), \text{ for } k = 0, 1, \ldots, \frac{N}{2} - 1,$$

where k is a sample index, $r(k)e^{j\pi\epsilon}$ is a $k^{th}$ sample of the second training symbol in which the non-Gaussian impulsive noise is not included, and $n_2(k)$ is second non-Gaussian impulsive noise included in the second training symbol.

6. The apparatus according to claim 1, wherein the training symbol includes a first training symbol having N/2 first samples and a second training symbol having N/2 second samples, and the Cauchy probability density function is a function in which a characteristic exponent of the BISαS probability density function to which first non-Gaussian impulsive noise included in the first training symbol and second non-Gaussian impulsive noise included in the second training symbol are modeled is 1.

7. The apparatus according to claim 6, wherein a noise component of the first non-Gaussian impulsive noise and the second non-Gaussian impulsive noise has a dispersion parameter $2_\gamma$ in the likelihood function of the Cauchy distribution.

8. The apparatus according to claim 1, wherein the frequency offset estimation value of the first frequency offset estimator is expressed by:

$$\tilde{\varepsilon}_C = \underset{\tilde{\varepsilon}}{\mathrm{argmax}}\{\Lambda_C(\tilde{\varepsilon})\},$$

where $\Lambda_C(\tilde{\epsilon})$ is the likelihood function of the Cauchy distribution.

9. An apparatus for estimating a frequency offset using one training symbol including first and second training symbols, which include an integer number N samples and have the same structure and value, in an OFDM system, comprising:

a first likelihood function calculator for calculating non-Gaussian impulsive noise included in the training symbol by a likelihood function of a Cauchy distribution in which a characteristic exponent of a bivariate isotropic symmetric alpha-stable (BISαS) probability density function is 1;

a second likelihood function calculator for calculating non-Gaussian impulsive noise included in the training symbol by a likelihood function of a Gaussian distribution in which the characteristic exponent of a BISαS probability density function is 2;

a second frequency offset estimator for estimating a first frequency offset estimation value by adding correlation values of two samples separated by N/2 for k from 0 to $$\frac{N}{2} - 1$$

in the likelihood function of the Gaussian distribution of the second likelihood function calculator;

a trial value set calculator for calculating the correlation values of the second frequency offset estimator as N/2 effective frequency offset values according to values of the N samples; and a third frequency offset estimator for estimating an effective frequency offset value in which the likelihood function of the Gaussian distribution of the first likelihood function calculator is highest among the effective frequency offset values of the trial value set calculator as a second frequency offset estimation value.

10. The apparatus according to claim 9, wherein the first and second likelihood function calculators model the non-Gaussian impulsive noise to the BISαS probability density function by using an SαS distribution.

11. The apparatus according to claim 9, wherein the likelihood function of the Cauchy distribution is expressed by:

$$\Lambda_C(\tilde{\varepsilon}) = \log\left[\prod_{k=0}^{N/2-1} f_{1,2\gamma}\left\{\left|y\left(k + \frac{N}{2}\right) - y(k)e^{j\pi\tilde{\varepsilon}}\right|\right\}\right]$$

$$= \sum_{k=0}^{N/2-1} \log\left[\frac{\gamma}{2\pi} \frac{1}{\left\{4\gamma^2 + \left|y\left(k + \frac{N}{2}\right) - y(k)e^{j\pi\tilde{\varepsilon}}\right|^2\right\}^{3/2}}\right],$$

where k is a sample index, N is the number of samples of the training symbol as the number of IFFT points, y(k) is a $k^{th}$ sample of the first training symbol including N/2 first samples of the training symbol, $$y\left(k + \frac{N}{2}\right)$$

is a $k^{th}$ sample of the second training symbol including N/2 second samples of the training symbol, $\tilde{\epsilon}$ is a trial value of a fractional part $\epsilon$ of a frequency offset, and a range of $\tilde{\epsilon}$ is $\tilde{\epsilon} \in [-0.5, 0.5]$.

12. The apparatus according to claim 9, wherein the likelihood function of the Gaussian distribution is expressed by:

$$\Lambda_G(\tilde{\varepsilon}) = \log\left[\prod_{k=0}^{N/2-1} f_{2,2\gamma}\left\{\left|y\left(k + \frac{N}{2}\right) - y(k)e^{j\pi\tilde{\varepsilon}}\right|\right\}\right]$$

$$= \frac{1}{(8\pi\gamma)^{N/2}} e^{-\frac{1}{8\gamma}\sum_{k=0}^{N/2-1}\left|y\left(k+\frac{N}{2}\right)-y(k)e^{j\pi\tilde{\varepsilon}}\right|^2},$$

where k is a sample index, N is the number of samples of the training symbol as the number of IFFT points, y(k) is a $k^{th}$ sample of the first training symbol including N/2 first samples of the training symbol, $$y\left(k + \frac{N}{2}\right)$$

is a $k^{th}$ sample of the second training symbol including N/2 second samples of the training symbol, $\tilde{\epsilon}$ is a trial value of a fractional part $\epsilon$ of a frequency offset, and a range of $\tilde{\epsilon}$ is $\tilde{\epsilon} \in [-0.5, 0.5]$.

13. The apparatus according to claim 9, wherein the first training symbol is expressed by:

$$y(k) = r(k) + n_1(k), \text{ for } k = 0, 1, \ldots, \frac{N}{2} - 1,$$

where k is a sample index, r(k) is a $k^{th}$ sample of the second training symbol in which the non-Gaussian impulsive noise is not included, and $n_1(k)$ is first non-Gaussian impulsive noise included in the first training symbol.

14. The apparatus according to claim 9, wherein the second training symbol is expressed by:

$$y\left(k + \frac{N}{2}\right) = r(k)e^{j\pi\epsilon} + n_2(k), \text{ for } k = 0, 1, \ldots, \frac{N}{2} - 1,$$

where k is a sample index, $r(k)e^{j\pi\epsilon}$ is a $k^{th}$ sample of the second training symbol in which the non-Gaussian impulsive noise is not included, and $n_2(k)$ is second non-Gaussian impulsive noise included in the second training symbol.

15. The apparatus according to claim 9, wherein a noise component of the first non-Gaussian impulsive noise and the second non-Gaussian impulsive noise has a dispersion parameter $2_\gamma$ in the likelihood function of the Cauchy distribution and the likelihood function of the Gaussian distribution.

16. The apparatus according to claim 9, wherein the first frequency offset estimation value of the second frequency offset estimator is expressed by:

$$\hat{\varepsilon}_G = \frac{1}{\pi} \angle \left\{ \sum_{k=0}^{N/2-1} y^*(k) y\left(k + \frac{N}{2}\right) \right\},$$

where k is a sample index, N is the number of samples of the training symbol, $y^*(k)$ is a complex conjugate of a $k^{th}$ sample of the first training symbol, and $$y\left(k + \frac{N}{2}\right)$$

is a $k^{th}$ sample of the second training symbol.

17. The apparatus according to claim 9, wherein the trial value set calculator calculates N/2 effective frequency offset values $\bar{\epsilon}(k)$ according to a k value as one set by:

$$\bar{\varepsilon}(k) = \frac{1}{\pi} \angle \left\{ y^*(k) y\left(k + \frac{N}{2}\right) \right\}, \text{ for } k = 0, 1, \ldots, \frac{N}{2} - 1,$$

where k is a sample index, N is the number of samples of the training symbol, $y^*(k)$ is a complex conjugate of a $k^{th}$ sample of the first training symbol, and $$y\left(k + \frac{N}{2}\right)$$

is a $k^{th}$ sample of the second training symbol.

18. The apparatus according to claim 9, wherein the second frequency offset estimation value of the third frequency offset estimator is expressed by:

$$\hat{\varepsilon_{SUB}} = \underset{\bar{\varepsilon}(k)}{\operatorname{argmax}}[\Lambda_C\{\bar{\varepsilon}(k)\}], \text{ for } k = 0, 1, \ldots, \frac{N}{2} - 1,$$

where $\Lambda_C\{\bar{\epsilon}(k)\}$ is the likelihood function of the Cauchy distribution according to the effective frequency offset value of the trial value set calculator.

* * * * *